United States Patent
Bian

(10) Patent No.: US 12,410,279 B2
(45) Date of Patent: *Sep. 9, 2025

(54) SURFACE DEPOSITED SUPPORTED GERMANIUM-BASED OR TITANIUM-GERMANIUM-BASED CATALYST AND PREPARATION METHOD THEREFOR AND USE THEREOF

(71) Applicants: JIANGSU GUOWANG HIGH-TECHNIQUE FIBER CO., LTD., Suzhou (CN); GUOWANG HIGH-TECH FIBER (SUQIAN) CO., LTD., Suqian (CN)

(72) Inventor: Shuchang Bian, Suzhou (CN)

(73) Assignees: JIANGSU GUOWANG HIGH-TECHNIQUE FIBER CO., LTD., Suzhou (CN); GUOWANG HIGH-TECH FIBER (SUQIAN) CO., LTD., Sugian (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/020,378

(22) Filed: Jan. 14, 2025

(65) Prior Publication Data

US 2025/0250391 A1 Aug. 7, 2025

(30) Foreign Application Priority Data

Feb. 6, 2024 (CN) .......................... 202410166675.7

(51) Int. Cl.
*C08G 63/672* (2006.01)
*B01J 37/02* (2006.01)
*C08G 63/85* (2006.01)
*C08G 63/86* (2006.01)

(52) U.S. Cl.
CPC ........ *C08G 63/863* (2013.01); *B01J 37/0215* (2013.01); *C08G 63/672* (2013.01); *C08G 63/85* (2013.01)

(58) Field of Classification Search
USPC ......................................................... 528/283
See application file for complete search history.

(56) References Cited

U.S. PATENT DOCUMENTS

| | | | |
|---|---|---|---|
| 6,346,070 B1 | 2/2002 | Ohmatsuzawa et al. | |
| 7,825,062 B2 * | 11/2010 | Gerdes | B01J 35/60 |
| | | | 502/355 |

FOREIGN PATENT DOCUMENTS

| | | |
|---|---|---|
| CN | 1121727 A | 5/1996 |
| CN | 1388810 A | 1/2003 |
| CN | 104640905 A | 5/2015 |
| CN | 114853990 A | 8/2022 |
| CN | 113429549 B | 3/2023 |
| CN | 116693830 B | 10/2023 |
| KR | 1020220053201 A | 4/2022 |
| WO | 03045550 A1 | 6/2003 |

* cited by examiner

*Primary Examiner* — Terressa Boykin
(74) *Attorney, Agent, or Firm* — Dinsmore & Shohl LLP

(57) ABSTRACT

The present disclosure relates to a surface deposited supported germanium-based or titanium-germanium-based catalyst and preparation method therefor and use thereof. The catalyst comprises a carrier, a supported deposition layer, and an active component, and the preparation method comprises: carrying out a precipitation reaction on a suspension of the carrier, a water-soluble calcium salt, a water-soluble aluminum salt, a water-soluble zirconium salt with a water-soluble hydroxide and an alkali, filtering, and calcining to form the supported deposition layer on the carrier; carrying out a hydrolysis reaction on the suspension of the carrier with a germanium source and a titanium source to obtain a catalyst precursor; carrying out a reaction on the precursor with a silicate ester and water, and loading the active component on the supported deposition layer to obtain the catalyst. When used to catalyze the polymerization of PETG or PCTG, it can significantly improve the viscosity and hue qualities.

17 Claims, No Drawings

SURFACE DEPOSITED SUPPORTED GERMANIUM-BASED OR TITANIUM-GERMANIUM-BASED CATALYST AND PREPARATION METHOD THEREFOR AND USE THEREOF

CROSS-REFERENCE TO RELATED APPLICATIONS

This application claims the benefit of priority to Chinese Patent Application No. 202410166675.7 filed on Feb. 6, 2024, and the entire disclosure of it is hereby incorporated by reference.

TECHNICAL FIELD

The present disclosure relates to a surface deposited supported germanium-based or titanium-germanium-based catalyst and a preparation method therefor and use thereof.

BACKGROUND

PETG and PCTG are both transparent, amorphous copolyesters. Both the two can be prepared by esterification and polymerization reactions using terephthalic acid PTA, ethylene glycol EG, and 1, 4-cyclohexanedimethanol CHDM in the presence of esterification and polymerization catalysts. The PETG and PCTG can be distinguished according to the different mole proportions of segments corresponding to CHDM in the total diol (CHDM and EG) segments in the copolyesters. Generally, the polymerization products having segments corresponding to CHDM in a molar ratio of 31% to 32% are called PETG copolyesters; while the polymerization products having segments corresponding to CHDM in a molar ratio of 60% to 62% are called PCTG copolyesters. Both the PETG and PCTG polymerization products have high transparency, good toughness and impact strength, excellent low-temperature toughness, high tear resistance, good processing performance, and excellent chemical resistance. Both can be processed using traditional molding methods such as extrusion, injection molding, blow molding, and vacuum forming. Both PETG and PCTG can be widely used in the markets of plates and sheets, high-performance shrink films, bottles, and profiles; they can also be used to produce toys, household utensils, and medical supplies, etc.

Catalysts used for catalyzing esterification and polymerization reactions for PETG and PCTG typically comprise, for example, antimony-based catalysts, titanium-based catalysts, germanium-based catalysts, tin-based catalysts, and etc. The brightness and non-crystalline properties of polymer products are crucial in the catalytic synthesis of PETG and PCTG.

Antimony-based catalysts are the cheapest and have good catalytic polymerization activity, however, during high-temperature reactions, they are prone to undergo reduction reactions to generate antimony ash, which can result in a low hue L value (generally ≥56.0) and a high b value (generally ≤4.0) of PETG and PCTG polymer products, leading to poor external color and inability to improve the L value of the products through toners, therefore, antimony-based catalysts are usually not used alone during polymerization.

Titanium-based catalysts have high activity, but they also catalyze high levels of side reactions, resulting in more by-products in the products, with yellowish color and a high b value, even if toners are used to adjust, the hue of the products is poor, therefore, titanium-based catalysts are usually not used alone during polymerization.

Tin-based catalysts also suffer from poor fastness to sunlight and yellowing of chips, and are toxic, causing significant environmental pollution.

Germanium-based catalysts are the most commonly used catalysts for synthesizing PETG and PCTG, usually used alone or in combination with other catalysts. Their catalytic effect is relatively mild, the level of side reactions is low, and the hue of the polymer products is relatively good, usually with an L value of ≤ 63.5.

Germanium dioxide is the most commonly used germanium-based catalyst, and it has the aforementioned advantages, however, it has high hardness and is usually difficult to pulverize the germanium dioxide powder to a particle size below 0.1~0.3 μm of requirement for solid-phase catalysts. The particle size of commercially available germanium dioxide powder is usually at the level of ≥75 μm, which is too large, and adding the germanium dioxide powder during the later stage of esterification of the self polymerization system will result in poor catalytic effect and prevent the polymerization reaction from being completed.

The current method of using germanium dioxide is adding germanium dioxide powder to distilled water under agitating conditions and refluxing for a long time, so that germanium dioxide reacts with water to form germanic acid ($H_2GeO_3$ or $Ge(OH)_4$), with a general concentration of only about 1.0%. And there are three types of germanium dioxide crystals: hexagonal crystal form, tetragonal crystal form and amorphous form, where only tetragonal crystal form has slightly soluble properties in water, and the other two are insoluble. In addition, the specific gravity of the hexagonal crystal form is 4.228, and the specific gravity of the tetragonal crystal form is 6.239, even if the germanium acid is added to the polymerization system in the aforementioned form, it is easy to dehydrate and recover to the solid state of germanium dioxide under high temperature conditions during the esterification and polymerization stages, and after a long time, it will deposit on the reactor wall and the melt pipeline, affecting the long-term operation of the device.

Chinese patent CN104640905A discloses the use of titanium and germanium compounds as composite catalysts for catalyzing the polymerization of PCTG, although it can improve the hue of the product, the hue performance of the product still needs to be improved.

Chinese patent CN113429549B discloses a composite catalyst for catalyzing the polymerization of poly(cyclohexylene dimethylene terephthalate), the catalyst is a metal/non-metal composite, and is a composite of a first catalyst Zr—Te—P, a second catalyst Si—Zr—B, or a third catalyst Si—Zr—Sn—Ba, although the composite catalyst can improve the polymerization reaction rate and reduce the occurrence of side reactions, the hue performance of the product still needs to be improved.

Chinese patent CN116693830B discloses a quaternary ammonium salt titanium/zirconium chelate catalyst prepared by reacting 2, 3-dihydroxypropyl-trimethylammonium chloride with tetrabutyl titanate or tetrabutyl zirconate, which is used for catalyzing the copolymerization of modified PETG. Although the color of the copolyester product is good, the structure of the catalyst is complex and its preparation process is complicated.

Chinese patent CN1121727A discloses a composite catalyst of manganese (II) acetate, zinc acetate, titanium isopropoxide and germanium dioxide, however, the viscosity of PETG prepared by this catalyst is not high enough.

SUMMARY

A purpose of the present disclosure is to provide a method for preparing a surface deposited supported germanium-based or titanium-germanium-based catalyst, when the germanium-based or titanium-germanium-based catalyst obtained by this preparation method is used to catalyze the polymerization of PETG or PCTG, it can significantly improve the viscosity and various hue qualities of the product, and the catalyst has good thermal stability and participates in polymerization reactions in a suspended state without depositing in the polymerization system.

To achieve the above purpose, a technical solution employed by the present disclosure is:

a method for preparing a supported catalyst, where the supported catalyst is a surface deposited supported germanium-based catalyst, and comprises a carrier, a supported deposition layer, and an active component, the carrier is an inorganic porous material modified and coated by a silicate ester, the supported deposition layer is located on the carrier and has a porous structure, and the active component is deposited on the supported deposition layer, and the preparation method comprises steps of: carrying out a precipitation reaction on a suspension of the carrier, a water-soluble calcium salt, a water-soluble aluminum salt, a water-soluble zirconium salt with a water-soluble hydroxide and an alkali, filtering, and heat treating to form the supported deposition layer on the carrier; the alkali is selected from carbonates and/or bicarbonates; the specific surface area of the carrier containing the supported deposition layer is greater than the specific surface area of the carrier; dispersing the carrier containing the supported deposition layer in water to obtain a suspension of the carrier containing the supported deposition layer; carrying out a hydrolysis reaction on the suspension of the carrier containing the supported deposition layer with a germanium source to obtain a catalyst precursor; carrying out a reaction on the catalyst precursor with a silicate ester and water, and loading the active component on the supported deposition layer to obtain the surface deposited supported germanium-based catalyst.

Another technical solution employed by the present disclosure is:

a method for preparing a supported catalyst, where the supported catalyst is a surface deposited supported titanium-germanium-based catalyst, and comprises a carrier, a supported deposition layer, and an active component, the carrier is an inorganic porous material modified and coated by silicate ester, the supported deposition layer is located on the carrier and has a porous structure, and the active component is deposited on the supported deposition layer, and the preparation method comprises steps of: carrying out a precipitation reaction on a suspension of the carrier, a water-soluble calcium salt, a water-soluble aluminum salt, a water-soluble zirconium salt with a water-soluble hydroxide and an alkali, filtering, and calcining to form the supported deposition layer on the carrier; the alkali is selected from carbonates and/or bicarbonates; the specific surface area of the carrier containing the supported deposition layer is greater than the specific surface area of the carrier; dispersing the carrier containing the supported deposition layer in water to obtain a suspension of the carrier containing the supported deposition layer; carrying out a hydrolysis reaction on the suspension of the carrier containing the supported deposition layer with a germanium source and a titanium source to obtain a catalyst precursor; carrying out a reaction on the catalyst precursor with a silicate ester and water, and loading the active component on the supported deposition layer to obtain the surface deposited supported titanium-germanium-based catalyst.

In the present disclosure, the supported deposition layer is first prepared on the carrier through a co-precipitation reaction of salts of calcium, aluminum, zirconium, etc, and the supported deposition layer is basic carbonates of three metals and provides a loading deposition site for the active component. The basic carbonates are decomposed into carbon dioxide gas after calcination, so that the supported deposition layer has a porous structure, and the specific surface area of this layer is larger than the specific surface area of the carrier, that is, the present disclosure increases the specific surface area of the carrier by precipitating the supported deposition layer on the carrier, and at the same time makes the carrier have more microporous structure, which is more conducive to the effective loading of the active component. Wherein, the zirconium element in the supported deposition layer can increase the strength of the carrier, and the calcium and aluminum elements are beneficial to the formation of the porous structure of the supported deposition layer.

When preparing germanium-based catalysts, the active component is loaded through in-situ hydrolysis reaction, and the germanium source undergoes hydrolysis reaction on the supported deposition layer to form germanium dioxide, which serves as the catalyst precursor. The catalyst precursor reacts with the silicate ester and water, where the catalyst precursor germanium dioxide is hydrolyzed to form a germanium-hydroxyl structure, the silicate ester is hydrolyzed to form a hydroxyl-containing silicon hydroxide, and the two undergo a condensation reaction to form a structure containing a Ge—O—Si bond, which contains germanium element and serves as the active component of the catalyst.

When preparing the titanium-germanium-based catalysts, in addition to the germanium source, the raw material for hydrolysis reaction also contains titanium source, the titanium source will undergo hydrolysis first to form titanium tetrahydroxide, which will undergo a condensation reaction with a hydroxyl-containing silicon hydroxide to form a compound containing a Ti—O—Si bond, this compound contains titanium element and also serves as the active component of the catalyst, at this time, the active component of the catalyst comprises germanium element and titanium element, which is a composite catalyst of titanium and germanium.

The present disclosure forms a supported deposition layer with a larger specific surface area and porous structure on a carrier, which allows the active component (either germanium element alone or a composite component of titanium and germanium elements) to participate in catalytic reactions at a nanoparticle size, thereby improving the catalytic activity in polymerization reactions, suppressing the occurrence of side reactions, and enhancing the hue of copolyester products.

In some implementations, the inorganic porous material is selected from nanoporous alumina, nanoporous alumina-zirconia, nanoporous silica, nanoporous barium sulfate, and combinations thereof, with a particle size of 20~80 nm, preferably 25~60 nm, more preferably 30~45 nm, and a specific surface area of 220~400 m²/g, preferably 230~320 m²/g.

In some implementations, the water-soluble calcium salt, the water-soluble aluminum salt and the water-soluble zirconium salt for preparing the carrier containing the supported deposition layer are selected from sulfates, acetates, or chlorides of corresponding metal elements, respectively; and/or, the water-soluble hydroxide is selected from one or two of sodium hydroxide and potassium hydroxide.

In some implementations, the carbonates are selected from sodium carbonate, potassium carbonate, ammonium carbonate, and combinations thereof.

In some implementations, the bicarbonates are selected from sodium bicarbonate, potassium bicarbonate, ammonium bicarbonate, and combinations thereof.

In some implementations, the molar ratio of the water-soluble calcium salt, the water-soluble aluminum salt and the water-soluble zirconium salt for preparing the carrier containing the supported deposition layer is (0.5~2.5): (1.0~2.0):(0.8~3.5).

In some implementations, the water-soluble calcium salt, the water-soluble aluminum salt and the water-soluble zirconium salt are added dropwise to the suspension of the carrier in the form of an aqueous solution; the water-soluble hydroxide and the alkali are added dropwise to the suspension of the carrier in the form of an aqueous solution; and the preparation method controls the synchronous dropwise addition of both.

In some implementations, the molar concentration of the water-soluble calcium salt in the aqueous solution is 0.1~3.0 mol/L.

In some implementations, the molar concentration of the water-soluble aluminum salt in the aqueous solution is 0.5~2.5 mol/L.

In some implementations, the molar concentration of the water-soluble zirconium salt in the aqueous solution is 0.1~3.5 mol/L.

In some implementations, the total molar concentration of the water-soluble hydroxide and the alkali in their aqueous solution is 0.1~2.0 mol/L.

In some implementations, when forming the supported deposition layer on the carrier, the precipitation reaction is carried out under a pH of 10~12.

In some implementations, the time of the precipitation reaction is 8~11 hours.

In some implementations, the temperature for the precipitation reaction is 70~100° C.

In some implementations, the preparation method further comprises steps of agitating the suspension for 1.0~4 h after the precipitation reaction is completed, then increasing the pressure to 0.7~1.2 Mpa, agitating and heating to 180~200° C., equilibrating for 2~4 hours, and then rapidly releasing the pressure to atmospheric pressure, lowering the suspension to room temperature, filtering, washing, drying, and crushing.

In some implementations, the preparation method further comprises a step of forming pores on the carrier after the precipitation reaction and before filtration; preferably, the step of forming pores on the carrier comprises steps of pressurizing and heating the reaction system after the precipitation reaction, and reducing the pressure to atmospheric pressure.

In some implementations, the pressurized pressure ranges from 0.7~1.2 Mpa.

In some implementations, the temperature is raised to 180~200° C., to decompose the carbonate hydroxide generated by the precipitation reaction, thereby increasing the specific surface area of the carrier.

In some implementations, when forming the supported deposition layer on the carrier, the temperature for the heating treatment is 290~310° C.

In some implementations, the time for the heating treatment is 2~6 hours.

In some implementations, the supported deposition layer is further dehydrated and pore-formed, and the carrier powder containing the supported deposition layer after treatment has a specific surface area of 600~900 m²/g, a particle size of 20~50 nm, and a large number of nano micropores formed on the surface of the powder.

In some implementations, the carrier powder containing a supported deposition layer is mixed with water under agitating conditions to form a suspension with a mass concentration of 10%-20%, and then ground 2~3 times by an ultrafine grinder, the ground suspension is then heated to 60-90° C.; a certain amount of germanium tetrachloride or tetraethylgermanium is slowly added to the suspension within 4.0~6.0 hours, under agitating conditions, germanium tetrachloride or tetraethylgermanium reacts with water to hydrolyze into germanium dioxide, which is deposited on the surface of the supported deposition layer, after the addition is finished, the system is agitated and aged at 80~90° C. for 1.5~2.0 hours, then a certain amount of the silicate ester is slowly added dropwise for surface coating within 2.0-4.0 hours, after the dropwise addition is finished, the system is aged for 1.0-3.0 hours, filtered, washed, dried, and ground to obtain the surface deposited supported germanium-based catalyst.

In some implementations, the germanium source is selected from one or two of germanium tetrachloride and tetraethylgermanium.

In some implementations, the silicate ester is selected from tetraethyl silicate, tetrabutyl silicate, tetrapropyl silicate, and combinations thereof.

In some implementations, the germanium source is added dropwise to the suspension of the carrier containing the supported deposition layer for hydrolysis reaction.

In some implementations, the mass ratio of the silicate ester to the germanium source is 1:(0.2~0.5).

In some implementations, in the surface deposited supported germanium-based catalyst, the mass ratio of the carrier, the supported deposition layer and the effective germanium in the active component is (72.5~87.5): (7.5~12.5): 5.0~15.0). In the present disclosure, the effective germanium in the active component refers to the germanium element in the active component calculated as germanium dioxide in equimolar terms.

In some implementations, the preparation method further comprises preparing a surface deposited supported germanium-based catalyst into a suspension with a mass concentration of 10%-20% in ethylene glycol under agitating conditions, after agitating evenly, grinding and filtering to prepare a catalyst suspension, where the effective germanium element content (in terms of germanium dioxide) in the catalyst suspension is 1.0%~3.0%, and the catalyst suspension is a stable suspension and can be stored for 3.0~5.0 months without sedimentation.

In some implementations, the carrier powder containing a supported deposition layer is mixed with distilled water under agitating conditions to form a suspension with a mass concentration of 10%-20%, and then ground 2~3 times by an ultrafine grinder, the ground suspension is then heated to 60-90° C.; under agitating conditions, a certain amount of germanium tetrachloride or tetraethylgermanium and tetrabutyl titanate or isopropyl titanate is simultaneously added dropwise to the suspension within 6.0~8.0 hours, a sodium hydroxide-sodium bicarbonate solution is simultaneously added dropwise, and the pH of the system is maintained between 10~12 during the dropwise addition, to carry out a hydrolysis co-precipitation reaction, the titanium source and the germanium source are simultaneously deposited on the surface of the nanoporous supported deposition layer, after the addition is finished, the system is aged for 1.0~2.0 hours under agitating conditions; then a certain amount of the silicate ester is slowly added dropwise into the mixed solution, the pH of the system is adjusted to 9~10, and after the addition is finished, the system is aged for 1.0~3.0 hours for surface coating of the nano supported catalyst, the suspension is filtered, the filter cake is repeatedly washed with water until all chloride ions are removed; the filter cake is dried and ground to prepare the surface deposited supported titanium-germanium-based catalyst.

For germanium-based catalysts, in some implementations, the preparation method further comprises steps of filtering, washing, and drying after the active component is loaded on the supported deposition layer, wherein the supported catalyst is in a powder state; preferably, the effective germanium content in the supported catalyst in powder state is 5.0%~15.0%.

For the titanium-germanium-based catalyst, in some implementations, the preparation method further comprises steps of filtering, washing, and drying after the active component is loaded on the supported deposition layer, wherein the supported catalyst is in a powder state; preferably, in the supported catalyst in powder state, the effective germanium content is 2.5%~7.5%, and the effective titanium content is 0.6%~1.9%.

In some implementations, the germanium source is selected from one or two of germanium tetrachloride and tetraethylgermanium.

In some implementations, the titanium source is selected from tetraisopropyl titanate, tetrabutyl titanate, titanium tetrachloride, and combinations thereof.

In some implementations, the silicate ester is selected from tetraethyl silicate, tetrabutyl silicate, tetrapropyl silicate, and combinations thereof.

In some implementations, the solution of a germanium source in hydrochloric acid and the titanium source is added dropwise to the suspension of the carrier containing the supported deposition layer for hydrolysis reaction.

In some implementations, the ratio of the mass of the silicate ester to the total mass of the germanium source and the titanium source is 1:(0.2~0.5).

For the titanium-germanium-based catalyst, in some implementations, in the surface deposited supported titanium-germanium-based catalyst, the mass ratio of the carrier, the supported deposition layer and the effective germanium and the effective titanium in the active component is (78.1~89.4):(7.5~12.5):(2.5~ 7.5) (in terms of germanium dioxide): (0.6~1.9) (in terms of titanium dioxide). In the present disclosure, the effective titanium refers to the titanium element in the active component calculated as titanium dioxide in equimolar terms.

In some implementations, the molar ratio of the titanium element to the germanium element in the active component is 1:(1.5~4.5).

In some implementations, the preparation method further comprises preparing a surface deposited supported titanium-germanium-based catalyst into a suspension with a mass concentration of 10%-20% in ethylene glycol under agitating conditions, after agitating evenly, grinding and filtering to prepare a catalyst suspension, where in the catalyst suspension, the effective germanium element content (in terms of germanium dioxide) in the catalyst suspension is 0.5%~1.5%, the effective titanium element content (in terms of titanium dioxide) is 0.12%~ 0.38%, and the catalyst suspension is a stable suspension and can be stored for 3.0~5.0 months without sedimentation.

For germanium-based catalysts, in some implementations, the preparation method further comprises steps of filtering, washing, adding a mixed solvent of water and ethylene glycol to disperse after the active component is loaded on the supported deposition layer, wherein the supported catalyst is in a suspension state.

For titanium-germanium-based catalysts, in some implementations, the preparation method further comprises steps of filtering, washing, adding a mixed solvent of water and ethylene glycol to disperse after the active component is loaded on the supported deposition layer, wherein the supported catalyst is in a suspension state.

In some implementations, the supported germanium-based catalyst and the titanium-germanium-based catalyst both have a particle size of 60~150 nm, and a specific surface area of 100~280 $m^2/g$, the particle size of the catalysts is between nanometer and sub-nanometer, and the catalytic active center is in nanometer state on the surface of the catalyst particles and can fully contact with oligomers, which improves the catalytic efficiency of polymerization reaction.

The present disclosure further provides a supported catalyst obtained by the method for preparing a supported catalyst mentioned above. The corresponding supported catalyst is a germanium-based catalyst or a titanium-germanium-based catalyst. When the two types of catalysts are used to catalyze the polymerization of PETG or PCTG, it can significantly improve the viscosity and various hue qualities of the product, and the catalysts have good thermal stability and participate in polymerization reactions in a suspended state without depositing in the polymerization system.

The present disclosure further provides use of the germanium-based catalyst or the titanium-germanium-based catalyst mentioned above for catalyzing the synthesis of polyesters.

In some implementations, when synthesizing a polyester, the germanium-based catalyst or the titanium-germanium-based catalyst is used alone, or in combination with other catalyst such as a titanium-based catalyst.

In some implementations, the polyester is selected from PETG and PCTG.

In the present disclosure, PETG refers to a copolyester of terephthalic acid PTA, ethylene glycol EG, and 1, 4-cyclohexanedimethanol CHDM in which the segments corresponding to CHDM account for 31% to 32% by mole of the total diol (CHDM and EG) segments; PCTG refers to a copolyester of terephthalic acid PTA, ethylene glycol EG, and 1, 4-cyclohexanedimethanol CHDM in which the segments corresponding to CHDM account for 60% to 62% by mole of the total diol (CHDM and EG) segments.

Due to the use of the above technical solutions, the present disclosure has the following advantages over the prior art:

When the surface deposited supported nano germanium-based or titanium-germanium-based catalyst of the present disclosure is used to catalyze the synthesis of PETG or PCTG polyester, the in-situ deposited germanium element or the composite element of germanium and titanium elements has a larger specific surface area, which can obtain better catalytic activity and reaction efficiency, and the catalyst can maintain a stable nano powder state in the esterification and polymerization processes, which can more efficiently catalyze the polymerization reaction, and compared with the traditional solid-phase germanium dioxide, the catalytic efficiency can be increased by 15%~20%, the product quality can be greatly improved, and the product hue can be significantly improved.

The two types of catalysts of the present disclosure have higher catalytic efficiency, and when achieving the same catalytic effect, the use of germanium element can be significantly reduced, which can further reduce the cost of the catalyst due to that germanium is expensive.

The two types of catalysts of the present disclosure can form stable suspensions in ethylene glycol, and the specific gravity of the catalyst powders is about 1.0~1.1, which is much lower than the specific gravity of germanium dioxide (above 4.0), the catalysts of the present disclosure have good dispersion stability in ethylene glycol, and can be suspended in the polymerization system during polymerization.

DETAILED DESCRIPTION OF EXEMPLARY EMBODIMENTS

The present disclosure is further explained in detail below in combination with specific embodiments; it should be understood that, those embodiments are to explain the basic principle, major features and advantages of the present disclosure, and the present disclosure is not limited by the scope of the following embodiments; the implementation conditions employed by the embodiments may be further adjusted according to particular requirements, and undefined implementation conditions usually are conditions in conventional experiments. In the following embodiments, unless otherwise specified, all raw materials are basically commercially available or prepared by conventional methods in the field.

The embodiments described below are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

Embodiment 1

This embodiment provided a supported germanium-based catalyst, which was used for the polymerization of PETG or PCTG, and was prepared by specific steps of:
Preparation of the Catalyst:

1) Ethylene glycol was heated to 50° C., accurately measured barium hydroxide octahydrate was slowly add into the reactor under high-speed agitating conditions (a high-speed homogenizer: speed 3000~6000 rpm), agitated until completely dissolved, then 10% mass concentration of dilute sulfuric acid was quickly added to the reactor according to the equimolar ratio of barium ions, high-speed agitation was maintained for 1.0 hour, the reaction heat heated up the suspension to about 90° C., the pH of the suspension was adjusted to be stable at 7.0, then the system was heated and refluxed to evaporate water, and cooled to 170° C., ethylene glycol was added again to make the mass content of barium sulfate powder be 20%, the system was agitated for 0.5 hour, and the pH value was measured again until the suspension pH value was completely stable at 7.0, and the obtained barium sulfate powder had a particle size of 20 nm and a specific surface area of 350 m²/g.

2) Tetraethyl silicate and sodium hydroxide were added dropwise to a suspension of barium sulfate in ethylene glycol with a pH of 7.0 to coat the surface of the barium sulfate powder with a layer of silica; after aging for 6 hours, a prepared mixed aqueous solution of calcium chloride, aluminum chloride, and zirconium acetate (where, the molar concentration of calcium chloride was 2.5 mol/L, the molar concentration of aluminum chloride was 0.5 mol/L, and the molar concentration of zirconium acetate was 0.8 mol/L), as well as a mixed aqueous solution of sodium hydroxide and sodium bicarbonate with a total molar concentration of 0.5 mol/L, were added dropwise to the reactor under high-speed agitating conditions in an amount in which the total valence of the above three metal ions was equal to the total valence of hydroxide and carbonate ions, the pH value of the suspension was strictly controlled between 10.0 and 10.2 during the addition process. The dropwise addition time was controlled to 11 hours, and the reaction temperature was controlled to 80° C., to allow the three metals mentioned above to deposit on the surface of the carrier. The obtained suspension continued to be agitated for 1.0 hour, then the system continued to be agitated under pressurized conditions (pressure of 0.7 MPa) and at the same time the system was heated to 180° C., after 2.0 hours of equilibration, the pressure was rapidly depressurized to atmospheric pressure, the suspension was cooled to room temperature, filtered, washed, dried, crushed with an ultra-fine pulverizer, and calcined in a muffle furnace at a calcination temperature of 290° C. for 6 hours, and the metal basic carbonates deposited on the surface of the carrier were dehydrated and pore-formed, forming a supported deposition layer with a porous structure on the surface of the carrier. The specific surface area of the carrier containing the supported deposition layer was 600~900 m²/g.

3) Distilled water was added to the carrier containing the supported deposition layer obtained in step 2) under agitating conditions to prepare a suspension with a mass percentage of 20%, after grinding the suspension twice using an ultrafine grinder, the suspension was heated to 90° C. A certain amount of germanium tetrachloride was slowly added dropwise to the above suspension under agitating conditions within 4.0 hours, germanium tetrachloride underwent a hydrolysis reaction with water to generate germanium dioxide, which was deposited on the surface of the supported deposition layer. After the dropwise addition was completed, the system was agitated and aged at 90° C. for 1.5 hours, then a certain amount of silicate ester was slowly added to the suspension within 2.0 hours, and after the dropwise addition was completed, the system was aged for 1.0 hour to obtain the catalyst suspension. The mass ratio of silicate ester to germanium tetrachloride was 1:0.2.

4) The above catalyst suspension was filtered, washed with distilled water, dried and crushed to give a supported germanium-based catalyst powder, which can be directly used for packaging and storage. When used for polymerization reaction, the powder was dispersed in ethylene glycol to obtain a suspension, and the mass percentage of catalyst powder in the suspension was 20%. The catalyst powder had a specific surface area of 280 m²/g, and a particle size of 100 nm. In the catalyst powder, the mass ratio of the carrier, the supported deposition layer and the effective germanium in the active component was 72.5:7.5:5.0.

Polymerization of PETG:

Continuous polymerization was carried out on a 30,000 ton/year PETG continuous polymerization plant, which comprised a first esterification reactor, a second esterification reactor (a three-chamber structure), a first prepolymerization reactor, a second prepolymerization reactor, and a high viscosity polymerization reactor.

Firstly, pure terephthalic acid PTA, ethylene glycol EG, and 1, 4-cyclohexanedimethanol CHDM in a molten state were mixed in a molar ratio of PTA:EG:CHDM=1:0.93:0.32 (where EG was in an excess feed ratio, all CHDM entered the corresponding segments in the copolyester, and the mole percentage of segments corresponding to CHDM in the total diol segments was 32%), and in a total molar ratio of PTA:(EG+CHDM)=1:1.25, the raw materials were accurately metered and slurried, the prepared catalyst suspension was injected into a slurry convey pipeline as an esterification catalyst, with an amount of 10 ppm (in terms of germanium dioxide) of the total mass of the melt, the prepared slurry was conveyed to the first esterification reactor through a screw metering pump, with the temperature in the first esterification reactor being controlled at 254~255° C. and the process column pressure being 70~80 kPa (positive pressure), the second esterification reactor was designed with multi-chambers having three chambers for easy addition of various additives, the prepared catalyst suspension was added to the second chamber of the second esterification reactor as the polymerization catalyst, the amount of polymerization catalyst was 60 ppm (in terms of germanium dioxide) of the total mass of the melt, a toner and a stabilizer (phosphate ester, etc.) were added into the third chamber of the second esterification reactor, the second esterification reactor was a normal-pressure reactor, and the esterification temperatures in the three chambers were controlled as follows: 255~256° C. in the first chamber, 253~254° C. in the second chamber, and 257~258° C. in the third chamber; the esterified materials after the esterification reactions were introduced into the first prepolymerization reactor, which was a vertical agitating structure with an inner and outer chamber design, the reaction temperature in the first prepolymerization reactor was controlled to be 258~260° C. and the vacuum degree was 9.0~11.0 kPa, the oligomer polymerized in the first prepolymerization reactor was introduced into the second prepolymerization reactor, which was a single-axis horizontal disc reactor, the reaction temperature in the second prepolymerization reactor was controlled to be 260~262° C., the prepolymers from the reaction in the second prepolymerization reactor were introduced into the high viscosity polymerization reactor through the prepolymerization melt pump and the prepolymerization filter, the high viscosity polymerization reactor adopted a front-rear two-shaft horizontal disc reactor, the temperature at the outlet of the high viscosity polymerization reactor was controlled to be 265~268° C., the vacuum degree was controlled to be 90~110 Pa, the dynamic viscosity of the melt at the outlet was controlled to 635~650 Pa·s, the intrinsic viscosity of PETG at the outlet was controlled to 0.781 (determined in a mixed solvent of phenol:tetrachloroethylene with a volume ratio of 3:2). The indicators for PETG chip are shown in Table 1 below.

Or Polymerization of PCTG:

Continuous polymerization was carried out on a 30,000 ton/year PCTG continuous polymerization plant, which comprised a first esterification reactor, a second esterification reactor (a three-chamber structure), a first prepolymerization reactor, a second prepolymerization reactor, and a high viscosity polymerization reactor.

Firstly, pure terephthalic acid PTA, ethylene glycol EG, and 1,4-cyclohexanedimethanol CHDM in a molten state were mixed in a molar ratio of PTA:EG:CHDM=1:0.63:0.63 (where EG was in an excess feed ratio, in the copolyester, the mole percentage of segments corresponding to CHDM in the total diol segments was 62%), and in a total molar ratio of PTA:(EG+CHDM)=1:1.26, the raw materials were accurately metered and slurried, the prepared catalyst suspension was injected into a slurry convey pipeline as an esterification catalyst, with an amount of 10 ppm (in terms of germanium dioxide) of the total mass of the melt, the prepared slurry was conveyed to the first esterification reactor through a screw metering pump, with the temperature in the first esterification reactor being controlled at 256~257° C. and the process column pressure being 70~80 kPa (positive pressure), the second esterification reactor was designed with multi-chambers having three chambers for easy addition of various additives, the prepared catalyst suspension was added to the second chamber of the second esterification reactor as the polymerization catalyst, the amount of polymerization catalyst was 60 ppm (in terms of germanium dioxide) of the total mass of the melt, a toner and a stabilizer (phosphate ester, etc.) were added into the third chamber of the second esterification reactor, the second esterification reactor was a normal-pressure reactor, and the esterification temperatures in the three chambers were controlled as: 255~256° C. in the first chamber, 253~254° C. in the second chamber, and 260~262° C. in the third chamber; the esterified materials after the esterification reactions were introduced into the first prepolymerization reactor, which was a vertical agitating structure with an inner and outer chamber design, the reaction temperature in the first prepolymerization reactor was controlled to be 266~268° C. and the vacuum degree was 9.0 kPa, the oligomer polymerized in the first prepolymerization reactor was introduced into the second prepolymerization reactor, which was a single-axis horizontal disc reactor, the reaction temperature in the second prepolymerization reactor was controlled to be 272~274° C., the prepolymer from the reaction in the second prepolymerization reactor were introduced into the high viscosity polymerization reactor through the prepolymerization melt pump and the prepolymerization filter, the high viscosity polymerization reactor adopted a two-shaft horizontal disc reactor with the shafts respectively arranged in front and rear portions, the temperature at the outlet of the high viscosity polymerization reactor was controlled to be 280~282° C., the vacuum degree was controlled to be 90~110 Pa, the dynamic viscosity of the melt at the outlet was controlled to 600~620 Pa·s, the intrinsic viscosity of PCTG at the outlet was controlled to 0.800 (determined in a mixed solvent of phenol:tetrachloroethylene with a volume ratio of 3:2). The indicators for PCTG chip are shown in Table 2 below.

Embodiment 2

Embodiment 2 provided a supported germanium-based catalyst, which was used for the polymerization of PETG or PCTG, and was prepared by specific steps basically the same as in Embodiment 1, by only differing in that: when preparing the catalyst, step 1) was not performed, and the suspension of barium sulfate in ethylene glycol with a pH of 7.0 in step 2) was replaced with an aqueous suspension of gamma (γ)-nanoporous alumina with a pH of 7.0, where the γ-nanoporous alumina had a particle size of 35 nm and a specific surface area of 240 $m^2$/g. It was used for the polymerization of PETG or PCTG, and the indicators for the chips of PETG and PCTG are shown in Tables 1-2 below, respectively.

Embodiment 3

Embodiment 3 provided a supported germanium-based catalyst, which was used for the polymerization of PETG or PCTG, and was prepared by specific steps basically the same as in Embodiment 1, by only differing in that: when preparing the catalyst, step 1) was not performed, and the suspension of barium sulfate in ethylene glycol with a pH of 7.0 in step 2) was replaced with an aqueous suspension of nanoporous alumina-zirconium oxide powder with a pH of 7.0, where the nanoporous alumina-zirconium oxide powder had a particle size of 60 nm and a specific surface area of 300 m$^2$/g. It was used for the polymerization of PETG or PCTG, and the indicators for the chips of PETG and PCTG are shown in Tables 1-2 below, respectively.

Embodiment 4

Embodiment 4 provided a supported germanium-based catalyst, which was used for the polymerization of PETG or PCTG, and was prepared by specific steps basically the same as in Embodiment 1, by only differing in that: when preparing the catalyst, step 1) was not performed, and the suspension of barium sulfate in ethylene glycol with a pH of 7.0 in step 2) was replaced with an aqueous suspension of nanoporous silica with a pH of 7.0, where the nanoporous silica had a particle size of 45 nm and a specific surface area of 270 m$^2$/g. It was used for the polymerization of PETG or PCTG, and the indicators for the chips of PETG and PCTG are shown in Tables 1-2 below, respectively.

Embodiment 5

Embodiment 5 provided a supported titanium-germanium-based catalyst, which was used for the polymerization of PETG or PCTG, and was prepared by specific steps basically the same as in Embodiment 1, by only differing in that: when preparing the catalyst, both titanium and germanium sources were added at the same time in step 3), and step 3) was specifically: distilled water was added to the carrier containing the supported deposition layer obtained in step 2) under agitating conditions to prepare a suspension with a mass percentage of 20%, after grinding the suspension twice using an ultrafine grinder, the suspension was heated to 90° C. A certain amount of diluted hydrochloric acid solution of germanium tetrachloride and a certain amount of tetrabutyl titanate were slowly added dropwise to the above suspension under agitating conditions within 4.0 hours, germanium tetrachloride underwent a hydrolysis reaction with water to generate germanium dioxide, and tetrabutyl titanate underwent a hydrolysis reaction with water to generate titanium dioxide, both of the germanium dioxide and titanium dioxide were deposited on the surface of the supported deposition layer. During the dropwise addition process, sodium hydroxide was used to adjust the pH of the suspension, maintaining pH between 10.0 and 10.2. After the dropwise addition was completed, the system was agitated and aged at 90° C. for 1.5 hours, then a certain amount of silicate ester was slowly added to the suspension within 2.0 hours, and after the dropwise addition was completed, the system was aged for 1.0 hour to obtain the catalyst suspension. The ratio of the mass of the silicate ester to the total mass of germanium tetrachloride and tetrabutyl titanate was 1:0.2. The molar ratio of tetrabutyl titanate to germanium tetrachloride was 1:1.5.

The catalyst powder obtained in step 4) had a specific surface area of 280 m$^2$/g, and a particle size of 100 nm. In the catalyst powder, the mass ratio of the carrier, the supported deposition layer, the effective germanium in the active component and the effective titanium in the active component was 78.1:7.5:2.5:1.25. The catalyst suspension in EG obtained in step 4) was a stable suspension that can be stored for 5 months without settling.

It was used for the polymerization of PETG or PCTG, and the polymerization steps were basically the same as in Embodiment 1, by only differing in that: the esterification catalyst was replaced with tetrabutyl titanate, which accounted for 3 ppm of the total mass of the melt (in terms of titanium element); the polymerization catalyst was replaced with the supported titanium-germanium-composite catalyst from Embodiment 5, where the mass of titanium accounted for 22.5 ppm (in terms of titanium dioxide) and the mass of germanium accounted for 45 ppm (in terms of germanium dioxide) of the total mass of the melt. The indicators for the chips of PETG and PCTG are shown in Tables 1-2 below, respectively.

Embodiment 6

Embodiment 6 provided a supported titanium-germanium-based catalyst, which was used for the polymerization of PETG or PCTG, and was prepared by specific steps basically the same as in Embodiment 5, by only differing in that: when preparing the catalyst, step 1) was not performed, and the suspension of barium sulfate in ethylene glycol with a pH of 7.0 in step 2) was replaced with an aqueous suspension of gamma (γ)-nanoporous alumina with a pH of 7.0, where the γ-nanoporous alumina had a particle size of 35 nm and a specific surface area of 240 m$^2$/g. It was used for the polymerization of PETG or PCTG, and the indicators for the chips of PETG and PCTG are shown in Tables 1-2 below, respectively.

Embodiment 7

Embodiment 7 provided a supported titanium-germanium-based catalyst, which was used for the polymerization of PETG or PCTG, and was prepared by specific steps basically the same as in Embodiment 5, by only differing in that: when preparing the catalyst, step 1) was not performed, and the suspension of barium sulfate in ethylene glycol with a pH of 7.0 in step 2) was replaced with an aqueous suspension of nanoporous alumina-zirconium oxide powder with a pH of 7.0, where the nanoporous alumina-zirconium oxide powder had a particle size of 60 nm and a specific surface area of 300 m$^2$/g. It was used for the polymerization of PETG or PCTG, and the indicators for the chips of PETG and PCTG are shown in Tables 1-2 below, respectively.

Embodiment 8

Embodiment 8 provided a supported titanium-germanium-based catalyst, which was used for the polymerization of PETG or PCTG, and was prepared by specific steps basically the same as in Embodiment 5, by only differing in that: when preparing the catalyst, step 1) was not performed, and the suspension of barium sulfate in ethylene glycol with a pH of 7.0 in step 2) was replaced with an aqueous suspension of nanoporous silica with a pH of 7.0, where the nanoporous silica had a particle size of 45 nm and a specific surface area of 270 m²/g. It was used for the polymerization of PETG or PCTG, and the indicators for the chips of PETG and PCTG are shown in Tables 1-2 below, respectively.

Embodiment 9

Embodiment 9 provided a supported germanium-based catalyst, which was used for the polymerization of PETG or PCTG, and was prepared by specific steps basically the same as in Embodiment 1, by only differing in that: when preparing the catalyst, drying and crushing in step 4) were not required, and a suspension was directly prepared. Step 4) specifically was, after filtering the suspension of the catalyst and washing it with distilled water, dispersing the washed solid in ethylene glycol to obtain a suspension, where the mass percentage of the catalyst powder in the suspension was 20%.

When it was used for the polymerization of PETG or PCTG, the polymerization effect is equivalent to that of Embodiment 1.

Comparative Example 1

Comparative Example 1 provided a method for polymerizing PETG or PCTG, which had the same polymerization steps as Embodiment 1, by only differing in that: the esterification and polymerization catalysts were replaced with an aqueous solution of germanium dioxide, and the amount of catalysts used was increased. The aqueous solution of germanium dioxide was prepared by adding germanium dioxide powder to distilled water and conducting a reflux reaction for 8~10 h, reacting germanium dioxide with water to form germanic acid. The mass concentration of germanium dioxide was 0.8%. The esterification catalyst accounted for 15 ppm (in terms of germanium dioxide) of the total mass of the melt, and polymerization catalyst accounted for 120 ppm (in terms of germanium dioxide) of the total mass of the melt. The polymerization results are shown in Tables 1-2 below.

Comparative Example 2

Comparative Example 2 provided a method for polymerizing PETG or PCTG, which had the same polymerization steps as Embodiment 1, by only differing in that: the esterification and polymerization catalysts were replaced with a solution of germanium dioxide in a mixed solvent of water and EG, and the amount of catalysts used was increased. The solution of germanium dioxide in a mixed solvent of water and EG was prepared by the following method: adding germanium dioxide powder to distilled water, heating, adding EG under agitating conditions, with a mass ratio of water to EG of 1:1, continuing to agitate and dissolve to obtain the solution in the mixed solvent. In the solution, the mass concentration of germanium dioxide was 0.8%. The esterification catalyst accounted for 15 ppm (in terms of germanium dioxide) of the total mass of the melt, and polymerization catalyst accounted for 120 ppm (in terms of germanium dioxide) of the total mass of the melt. The polymerization results are shown in Tables 1-2 below.

Comparative Example 3

Comparative Example 3 provided a method for polymerizing PETG or PCTG, which had the same polymerization steps as Embodiment 1, by only differing in the types of esterification and polymerization catalysts (a titanium-antimony composite catalyst), timing and dosage of addition of the catalysts, and polymerization process parameters. Specifically:

Polymerization of PETG:

Continuous polymerization was carried out on a 30,000 ton/year PETG continuous polymerization plant, which comprised a first esterification reactor, a second esterification reactor (a three-chamber structure), a first prepolymerization reactor, a second prepolymerization reactor, and a high viscosity polymerization reactor.

Firstly, pure terephthalic acid PTA, ethylene glycol EG, and 1, 4-cyclohexanedimethanol CHDM in a molten state were mixed in a molar ratio of PTA:EG:CHDM=1:0.93:0.32, and in a total molar ratio of PTA:(EG+CHDM)=1:1.25, the raw materials were accurately metered and slurried, a titanium-based catalyst tetrabutyl titanate was injected into a slurry convey pipeline as an esterification catalyst, with an amount of 3 ppm (in terms of titanium element) of the total mass of the melt, the prepared slurry was conveyed to the first esterification reactor through a screw metering pump, with the temperature in the first esterification reactor being controlled at 254~255° C. and the process column pressure being 70~80 kPa (positive pressure), the second esterification reactor was designed with multi-chambers having three chambers for easy addition of various additives, ethylene glycol antimony was added to the third chamber of the second esterification reactor as the polymerization catalyst, and accounted for 225 ppm (in terms of antimony element) of the total mass of the melt, a toner and a stabilizer (phosphate ester, etc.) were added into the third chamber of the second esterification reactor, the second esterification reactor was a normal-pressure reactor, and the esterification temperatures in the three chambers were controlled as follows: 255~256° C. in the first chamber, 253~254° C. in the second chamber, and 257~258° C. in the third chamber; the esterified materials after the esterification reactions were introduced into the first prepolymerization reactor, which was a vertical agitating structure with an inner and outer chamber design, the reaction temperature in the first prepolymerization reactor was controlled to be 262~263° C. and the vacuum degree was 9.0 kPa, the oligomer polymerized in the first prepolymerization reactor was introduced into the second prepolymerization reactor, which was a single-axis horizontal disc reactor, the reaction temperature in the second prepolymerization reactor was controlled to be 264~265° C., the prepolymers from the reaction in the second prepolymerization reactor were introduced into the high viscosity polymerization reactor through the prepolymerization melt pump and the prepolymerization filter, the high viscosity polymerization reactor adopted a front-rear two-shaft horizontal disc reactor, the temperature at the outlet of the high viscosity polymerization reactor was controlled to be 275~277° C., the vacuum degree was controlled to be 90~110 Pa, the dynamic viscosity of the melt at the outlet was controlled to 635~650 Pa·s, the intrinsic viscosity of PETG at the outlet was controlled to 0.780 (determined in a mixed solvent of phenol:tetrachloroethylene with a volume ratio of 3:2). The indicators for PETG chip are shown in Table 1 below.

Or Polymerization of PCTG:

Continuous polymerization was carried out on a 30,000 ton/year PCTG continuous polymerization plant, which comprised a first esterification reactor, a second esterification reactor (a three-chamber structure), a first prepolymerization reactor, a second prepolymerization reactor, and a high viscosity polymerization reactor.

Firstly, pure terephthalic acid PTA, ethylene glycol EG, and 1, 4-cyclohexanedimethanol CHDM in a molten state were mixed in a molar ratio of PTA:EG:CHDM=1:0.63: 0.63, and in a total molar ratio of PTA:(EG+CHDM)=1: 1.26, the raw materials were accurately metered and slurried, a titanium-based catalyst tetrabutyl titanate was injected into a slurry convey pipeline as an esterification catalyst, with an amount of 3 ppm (in terms of titanium element) of the total mass of the melt, the prepared slurry was conveyed to the first esterification reactor through a screw metering pump, with the temperature in the first esterification reactor being controlled at 256~257° C. and the process column pressure being 70~80 kPa (positive pressure), the second esterification reactor was designed with multi-chambers having three chambers for easy addition of various additives, ethylene glycol antimony was added to the third chamber of the second esterification reactor as the polymerization catalyst, and accounted for 240 ppm (in terms of antimony element) of the total mass of the melt, a toner and a stabilizer (phosphate ester, etc.) were added into the third chamber of the second esterification reactor, the second esterification reactor was a normal-pressure reactor, and the esterification temperatures in the three chambers were controlled as follows: 255~256° C. in the first chamber, 253~254° C. in the second chamber, and 260~262° C. in the third chamber; the esterified materials after the esterification reactions were introduced into the first prepolymerization reactor, which was a vertical agitating structure with an inner and outer chamber design, the reaction temperature in the first prepolymerization reactor was controlled to be 266~268° C. and the vacuum degree was 9.0 kPa, the oligomer polymerized in the first prepolymerization reactor was introduced into the second prepolymerization reactor, which was a single-axis horizontal disc reactor, the reaction temperature in the second prepolymerization reactor was controlled to be 272~274° C., the prepolymers from the reaction in the second prepolymerization reactor were introduced into the high viscosity polymerization reactor through the prepolymerization melt pump and the prepolymerization filter, the high viscosity polymerization reactor adopted a front-rear two-shaft horizontal disc reactor, the temperature at the outlet of the high viscosity polymerization reactor was controlled to be 280~282° C., the vacuum degree was controlled to be 90~110 Pa, the dynamic viscosity of the melt at the outlet was controlled to 600~620 Pa·s, the intrinsic viscosity of PCTG at the outlet was controlled to 0.806 (determined in a mixed solvent of phenol:tetrachloroethylene with a volume ratio of 3:2). The indicators for PCTG chip are shown in Table 2 below.

Comparative Example 4

Comparative Example 4 provided a method for polymerizing PETG or PCTG, which had the same polymerization steps as Embodiment 1, by only differing in the types of esterification and polymerization catalysts (a titanium-based catalyst), timing and dosage of addition of the catalysts, and polymerization process parameters. Specifically:
Polymerization of PETG:
Continuous polymerization was carried out on a 30,000 ton/year PETG continuous polymerization plant, which comprised a first esterification reactor, a second esterification reactor (a three-chamber structure), a first prepolymerization reactor, a second prepolymerization reactor, and a high viscosity polymerization reactor.

Firstly, pure terephthalic acid PTA, ethylene glycol EG, and 1, 4-cyclohexanedimethanol CHDM in a molten state were mixed in a molar ratio of PTA:EG:CHDM=1:0.93: 0.32, and in a total molar ratio of PTA:(EG+CHDM)=1: 1.25, the raw materials were accurately metered and slurried, a titanium-based catalyst tetrabutyl titanate was injected into a slurry convey pipeline as an esterification catalyst, with an amount of 3 ppm (in terms of titanium element) of the total mass of the melt, the prepared slurry was conveyed to the first esterification reactor through a screw metering pump, with the temperature in the first esterification reactor being controlled at 254~255° C. and the process column pressure being 70~80 kPa (positive pressure), the second esterification reactor was designed with multi-chambers having three chambers for easy addition of various additives, the titanium-based catalyst tetrabutyl titanate was added to the third chamber of the second esterification reactor as the polymerization catalyst, and accounted for 20 ppm (in terms of titanium element) of the total mass of the melt, a toner and a stabilizer (phosphate ester, etc.) were added into the third chamber of the second esterification reactor, the second esterification reactor was a normal-pressure reactor, and the esterification temperatures in the three chambers were controlled as follows: 255~256° C. in the first chamber, 253~254° C. in the second chamber, and 257~258° C. in the third chamber; the esterified materials after the esterification reactions were introduced into the first prepolymerization reactor, which was a vertical agitating structure with an inner and outer chamber design, the reaction temperature in the first prepolymerization reactor was controlled to be 260~261° C. and the vacuum degree was 9.0 kPa, the oligomer polymerized in the first prepolymerization reactor was introduced into the second prepolymerization reactor, which was a single-axis horizontal disc reactor, the reaction temperature in the second prepolymerization reactor was controlled to be 261~262° C., the prepolymers from the reaction in the second prepolymerization reactor were introduced into the high viscosity polymerization reactor through the prepolymerization melt pump and the prepolymerization filter, the high viscosity polymerization reactor adopted a front-rear two-shaft horizontal disc reactor, the temperature at the outlet of the high viscosity polymerization reactor was controlled to be 265~267° C., the vacuum degree was controlled to be 90~110 Pa, the dynamic viscosity of the melt at the outlet was controlled to 630~650 pa·s, the intrinsic viscosity of PETG at the outlet was controlled to 0.780 (determined in a mixed solvent of phenol:tetrachloroethylene with a volume ratio of 3:2). The indicators for PETG chip are shown in Table 1 below.
Or Polymerization of PCTG:
Continuous polymerization was carried out on a 30,000 ton/year PCTG continuous polymerization plant, which comprised a first esterification reactor, a second esterification reactor (a three-chamber structure), a first prepolymerization reactor, a second prepolymerization reactor, and a high viscosity polymerization reactor.

Firstly, pure terephthalic acid PTA, ethylene glycol EG, and 1, 4-cyclohexanedimethanol CHDM in a molten state were mixed in a molar ratio of PTA:EG:CHDM=1:0.63: 0.63, and in a total molar ratio of PTA:(EG+CHDM)=1: 1.26, the raw materials were accurately metered and slurried, a titanium-based catalyst tetrabutyl titanate was injected into a slurry convey pipeline as an esterification catalyst, with an amount of 5 ppm (in terms of titanium element) of the total mass of the melt, the prepared slurry was conveyed to the first esterification reactor through a screw metering pump, with the temperature in the first esterification reactor being controlled at 256~257° C. and the process column pressure being 70~80 kPa (positive pressure), the second esterification reactor was designed with multi-chambers having three chambers for easy addition of various additives, the titanium-based catalyst tetrabutyl titanate was added to the third chamber of the second esterification reactor (added in the third chamber to facilitate evaporation of water in the catalyst) as the polymerization catalyst, and accounted for 20 ppm (in terms of titanium element) of the total mass of the melt, a toner and a stabilizer (phosphate ester, etc.) were added into the third chamber of the second esterification reactor, the second esterification reactor was a normal-pressure reactor, and the esterification temperatures in the three chambers were controlled as follows: 255~256° C. in the first chamber, 253~254° C. in the second chamber, and 260~262° C. in the third chamber; the esterified materials after the esterification reactions were introduced into the first prepolymerization reactor, which was a vertical agitating structure with an inner and outer chamber design, the reaction temperature in the first prepolymerization reactor was controlled to be 266~268° C. and the vacuum degree was 9.0 kPa, the oligomer polymerized in the first prepolymerization reactor was introduced into the second prepolymerization reactor, which was a single-axis horizontal disc reactor, the reaction temperature in the second prepolymerization reactor was controlled to be 271~273° C., the prepolymers from the reaction in the second prepolymerization reactor were introduced into the high viscosity polymerization reactor through the prepolymerization melt pump and the prepolymerization filter, the high viscosity polymerization reactor adopted a front-rear two-shaft horizontal disc reactor, the temperature at the outlet of the high viscosity polymerization reactor was controlled to be 277~278° C., the vacuum degree was controlled to be 90~110 Pa, the dynamic viscosity of the melt at the outlet was controlled to 610~630 pa·s, the intrinsic viscosity of PCTG at the outlet was controlled to 0.800 (determined in a mixed solvent of phenol:tetrachloroethylene with a volume ratio of 3:2). The indicators for PCTG chip are shown in Table 2 below.

The polyester melts obtained from the respective embodiments and comparative examples was sliced, and properties of chips were tested using GB/T 14190-2017 standard, and the results are shown in Tables 1-2 below, where IV refers to intrinsic viscosity measured in a mixed solvent of phenol and tetrachloroethylene with a volume ratio of 3:2, and DEG, $H_2O$, ash content, Fe, and agglomerated particles refer to the mass fraction content of diethylene glycol, water, ash, Fe element, and agglomerated particles in the polyester, respectively.

TABLE 1

Physical and chemical indicators of PETG

| | IV/ dL/g | DEG/ % | End carboxyl content/ mol/t | $H_2O$/ % | Ash/ % | Fe/ mg/kg | Agglomerated particles ≤10 μm/% | Hue L | a | b |
|---|---|---|---|---|---|---|---|---|---|---|
| Embodiment 1 | 0.781 | 1.229 | 15.92 | 0.72 | 0.01 | 1 | 0.0 | 65.15 | −1.29 | −1.72 |
| Embodiment 2 | 0.780 | 1.222 | 14.57 | 0.75 | 0.00 | 2 | 0.0 | 64.87 | −1.88 | −1.09 |
| Embodiment 3 | 0.779 | 1.227 | 14.89 | 0.63 | 0.01 | 1 | 0.0 | 65.36 | −1.56 | 0.15 |
| Embodiment 4 | 0.783 | 1.231 | 15.10 | 0.59 | 0.00 | 1 | 0.0 | 66.13 | −1.35 | −0.77 |
| Embodiment 5 | 0.781 | 1.235 | 15.39 | 0.59 | 0.01 | 1 | 0.0 | 65.38 | −1.57 | −1.08 |
| Embodiment 6 | 0.783 | 1.227 | 15.57 | 0.67 | 0.01 | 1 | 0.0 | 65.42 | −1.78 | −1.23 |
| Embodiment 7 | 0.778 | 1.238 | 15.45 | 0.62 | 0.00 | 1 | 0.0 | 64.89 | −1.82 | −2.01 |
| Embodiment 8 | 0.780 | 1.229 | 15.05 | 0.55 | 0.01 | 1 | 0.0 | 66.05 | −1.75 | −0.02 |
| Embodiment 9 | 0.782 | 1.223 | 15.78 | 0.61 | 0.01 | 1 | 0.1 | 64.14 | −0.65 | 0.88 |
| Comparative example 1 | 0.778 | 1.220 | 15.89 | 0.45 | 0.01 | 1 | 0.0 | 66.83 | −0.98 | −1.89 |
| Comparative example 2 | 0.779 | 1.195 | 14.62 | 0.58 | 0.02 | 1 | 0.0 | 65.36 | −1.57 | −1.28 |
| Comparative example 3 | 0.780 | 1.221 | 15.35 | 0.62 | 0.00 | 3 | 0.1 | 54.62 | −3.26 | 1.55 |
| Comparative example 4 | 0.778 | 1.170 | 15.22 | 0.49 | 0.02 | 1 | 0.0 | 58.01 | −0.86 | 1.65 |

TABLE 2

Physical and chemical indicators of PCTG

| | IV/ dL/g | DEG/ % | End carboxyl content/ mol/t | $H_2O$/ % | Ash/ % | Fe/ mg/kg | Agglomerated particles ≤10 μm/% | Hue L | a | b |
|---|---|---|---|---|---|---|---|---|---|---|
| Embodiment 1 | 0.800 | 0.388 | 15.99 | 0.65 | 0.01 | 1 | 0.0 | 65.89 | −1.59 | −1.56 |
| Embodiment 2 | 0.803 | 0.383 | 15.67 | 0.61 | 0.01 | 1 | 0.0 | 66.20 | −1.81 | −1.44 |
| Embodiment 3 | 0.797 | 0.389 | 15.81 | 0.59 | 0.01 | 1 | 0.0 | 65.32 | −1.47 | −1.93 |
| Embodiment 4 | 0.802 | 0.382 | 15.43 | 0.58 | 0.01 | 1 | 0.0 | 66.11 | −1.77 | −1.65 |
| Embodiment 5 | 0.803 | 0.387 | 15.45 | 0.70 | 0.01 | 1 | 0.0 | 64.68 | −1.07 | −0.99 |
| Embodiment 6 | 0.797 | 0.379 | 14.89 | 0.63 | 0.01 | 1 | 0.0 | 64.98 | −1.59 | −1.25 |
| Embodiment 7 | 0.802 | 0.385 | 14.96 | 0.59 | 0.01 | 1 | 0.0 | 65.29 | −1.80 | −0.75 |
| Embodiment 8 | 0.805 | 0.378 | 15.20 | 0.62 | 0.01 | 1 | 0.0 | 64.76 | −1.54 | −0.57 |
| Embodiment 9 | 0.801 | 0.382 | 15.38 | 0.52 | 0.02 | 1 | 0.0 | 63.87 | −0.85 | 0.63 |
| Comparative example 1 | 0.802 | 0.386 | 15.89 | 0.55 | 0.01 | 1 | 0.0 | 66.80 | −1.98 | −1.82 |

TABLE 2-continued

Physical and chemical indicators of PCTG

|  | IV/ dL/g | DEG/ % | End carboxyl content/ mol/t | $H_2O$/ % | Ash/ % | Fe/ mg/kg | Agglomerated particles ≤10 μm/% | Hue L | a | b |
|---|---|---|---|---|---|---|---|---|---|---|
| Comparative example 2 | 0.803 | 0.379 | 14.65 | 0.58 | 0.02 | 1 | 0.0 | 65.75 | −1.57 | −1.55 |
| Comparative example 3 | 0.806 | 0.382 | 15.37 | 0.64 | 0.01 | 2 | 0.1 | 55.47 | −0.86 | 1.55 |
| Comparative example 4 | 0.800 | 0.378 | 14.29 | 0.59 | 0.02 | 1 | 0.2 | 57.66 | −0.16 | 1.65 |

It can be seen that when using the specific supported germanium-based catalyst of the present disclosure for catalyzing the polymerization of PETG or PCTG, the resulting copolyester product has high viscosity and excellent hue, which is superior to traditional germanium dioxide catalysts, titanium-based catalysts, or titanium-antimony composite catalysts, and the catalyst of the present disclosure has higher catalytic activity and better catalytic efficiency, and when achieving the same catalytic efficiency, the amount is reduced compared to traditional germanium-based catalysts, thereby reducing the catalyst cost.

The embodiments described above are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

What is claimed is:

1. A method for preparing a supported catalyst, the supported catalyst being a surface deposited supported germanium-based catalyst, wherein, the catalyst comprises a carrier, a supported deposition layer, and an active component, the carrier is an inorganic porous material modified and coated by a silicate ester, the supported deposition layer is located on the carrier and has a porous structure, and the active component is deposited on the supported deposition layer, and the preparation method comprises steps of: carrying out a precipitation reaction on a suspension of the carrier, a water-soluble calcium salt, a water-soluble aluminum salt, a water-soluble zirconium salt with a water-soluble hydroxide and an alkali, filtering, and heat treating to form the supported deposition layer on the carrier; the alkali is selected from carbonates and/or bicarbonates; the specific surface area of the carrier containing the supported deposition layer is greater than the specific surface area of the carrier; dispersing the carrier containing the supported deposition layer in water to obtain a suspension of the carrier containing the supported deposition layer; carrying out a hydrolysis reaction on the suspension of the carrier containing the supported deposition layer with a germanium source to obtain a catalyst precursor; carrying out a reaction on the catalyst precursor with a silicate ester and water, and loading the active component on the supported deposition layer to obtain the surface deposited supported germanium-based catalyst; the water-soluble hydroxide is selected from one or two of sodium hydroxide and potassium hydroxide; the molar ratio of the water-soluble calcium salt, the water-soluble aluminum salt and the water-soluble zirconium salt for preparing the carrier containing the supported deposition layer is (0.5-2.5):(1.0-2.0):(0.8-3.5); in the surface deposited supported germanium-based catalyst, the mass ratio of the carrier, the supported deposition layer and the effective germanium in the active component is (72.5-87.5):(7.5-12.5):(5.0-15.0), wherein the inorganic porous material is selected from nanoporous alumina, nanoporous alumina-zirconia, nanoporous silica, nanoporous barium sulfate, and combinations thereof, with a particle size of 20-80 nm and a specific surface area of 220-400 $m^2$/g.

2. A method for preparing a supported catalyst, the supported catalyst being a surface deposited supported titanium-germanium-based catalyst, wherein, the catalyst comprises a carrier, a supported deposition layer, and an active component, the carrier is an inorganic porous material modified and coated by a silicate ester, the supported deposition layer is located on the carrier and has a porous structure, and the active component is deposited on the supported deposition layer, and the preparation method comprises steps of: carrying out a precipitation reaction on a suspension of the carrier, a water-soluble calcium salt, a water-soluble aluminum salt, a water-soluble zirconium salt with a water-soluble hydroxide and an alkali, filtering, and calcining to form the supported deposition layer on the carrier; the alkali is selected from carbonates and/or bicarbonates; the specific surface area of the carrier containing the supported deposition layer is greater than the specific surface area of the carrier; dispersing the carrier containing the supported deposition layer in water to obtain a suspension of the carrier containing the supported deposition layer; carrying out a hydrolysis reaction on the suspension of the carrier containing the supported deposition layer with a germanium source and a titanium source to obtain a catalyst precursor; carrying out a reaction on the catalyst precursor with a silicate ester and water, and loading the active component on the supported deposition layer to obtain the surface deposited supported titanium-germanium-based catalyst; the water-soluble hydroxide is selected from one or two of sodium hydroxide and potassium hydroxide; the molar ratio of the water-soluble calcium salt, the water-soluble aluminum salt and the water-soluble zirconium salt for preparing the carrier containing the supported deposition layer is (0.5-2.5):(1.0-2.0):(0.8-3.5); in the surface deposited supported titanium-germanium-based catalyst, the mass ratio of the carrier, the supported deposition layer, and the effective germanium and the effective titanium in the active component is (78.1-89.4):(7.5-12.5):(2.5-7.5):(0.6-1.9), wherein the inorganic porous material is selected from nanoporous alumina, nanoporous alumina-zirconia, nanoporous silica, nanoporous barium sulfate, and combinations thereof, with a particle size of 20-80 nm and a specific surface area of 220-400 m²/g.

3. The method for preparing a supported catalyst according to claim 1, wherein, the water-soluble calcium salt, the water-soluble aluminum salt and the water-soluble zirconium salt for preparing the carrier containing the supported deposition layer are selected from sulfates, acetates, or chlorides of corresponding metal elements, respectively; and/or, the carbonates are selected from sodium carbonate, potassium carbonate, ammonium carbonate, and combinations thereof; and/or, the bicarbonates are selected from sodium bicarbonate, potassium bicarbonate, ammonium bicarbonate, and combinations thereof.

4. The method for preparing a supported catalyst according to claim 1, wherein, the water-soluble calcium salt, the water-soluble aluminum salt and the water-soluble zirconium salt are added dropwise to the suspension of the carrier in the form of an aqueous solution; the water-soluble hydroxide and the alkali are added dropwise to the suspension of the carrier in the form of an aqueous solution; and the preparation method controls the synchronous dropwise addition of both.

5. The method for preparing a supported catalyst according to claim 1, wherein, the molar concentration of the water-soluble calcium salt in the aqueous solution is 0.1-3.0 mol/L; and/or, the molar concentration of the water-soluble aluminum salt in the aqueous solution is 0.5-2.5 mol/L; and/or, the molar concentration of the water-soluble zirconium salt in the aqueous solution is 0.1-3.5 mol/L; and/or, the total molar concentration of the water-soluble hydroxide and the alkali in their aqueous solution is 0.1-2.0 mol/L.

6. The method for preparing a supported catalyst according to claim 1, wherein, when forming the supported deposition layer on the carrier, the precipitation reaction is carried out under a pH of 10-12; and/or, the time of the precipitation reaction is 8-11 hours; and/or, the temperature for the precipitation reaction is 70-100° C.

7. The method for preparing a supported catalyst according to claim 1, wherein, when forming the supported deposition layer on the carrier, the temperature for the heating treatment is 290-310° C.; and/or, the time for the heating treatment is 2-6 hours, and the supported deposition layer is further dehydrated and pore-formed, and the carrier powder containing the supported deposition layer after treatment has a specific surface area of 600-900 m²/g, a particle size of 20-50 nm, and a large number of nano micropores formed on the surface of the powder.

8. The method for preparing a supported catalyst according to claim 1, wherein, the carrier powder containing a supported deposition layer is mixed with water under agitating conditions to form a suspension with a mass concentration of 10%-20%, and then ground 2-3 times by an ultrafine grinder, the ground suspension is then heated to 60-90° C.; a certain amount of germanium tetrachloride or tetraethylgermanium is slowly added to the suspension within 4.0-6.0 hours, under agitating conditions, germanium tetrachloride or tetraethylgermanium reacts with water to hydrolyze into germanium dioxide, which is deposited on the surface of the supported deposition layer, after the addition is finished, the system is agitated and aged at 80-90° C. for 1.5-2.0 hours, then a certain amount of the silicate ester is slowly added dropwise for surface coating within 2.0-4.0 hours, after the dropwise addition is finished, the system is aged for 1.0-3.0 hours to generate the surface deposited supported germanium-based catalyst, which is filtered, washed, dried, and ground to complete the preparation of the surface deposited supported germanium-based catalyst.

9. The method for preparing a supported catalyst according to claim 1, wherein, the germanium source is selected from one or two of germanium tetrachloride and tetraethylgermanium; and/or, the silicate ester is selected from tetraethyl silicate, tetrabutyl silicate, tetrapropyl silicate, and combinations thereof; and/or, the germanium source is added dropwise to the suspension of the carrier containing the supported deposition layer for a hydrolysis reaction; and/or, the mass ratio of the silicate ester to the germanium source is 1:(0.2-0.5).

10. The method for preparing a supported catalyst according to claim 1, wherein, the preparation method further comprises preparing a surface deposited supported germanium-based catalyst into a suspension with a mass concentration of 10%-20% in ethylene glycol under agitating conditions, after agitating evenly, grinding and filtering to prepare a catalyst suspension, where in the catalyst suspension, the effective germanium element content is 1.0%-3.0% in terms of germanium dioxide.

11. The method for preparing a supported catalyst according to claim 2, wherein, the carrier powder containing a supported deposition layer is mixed with distilled water under agitating conditions to form a suspension with a mass concentration of 10%-20%, and then ground 2-3 times by an ultrafine grinder, the ground suspension is then heated to 60-90° C.; under agitating conditions, a certain amount of a solution of germanium tetrachloride or tetraethylgermanium in hydrochloric acid and tetrabutyl titanate or isopropyl titanate is simultaneously added dropwise to the suspension within 6.0-8.0 hours, a sodium hydroxide-sodium bicarbonate solution is simultaneously added dropwise, and the pH of the system is maintained between 10-12 during the dropwise addition, to carry out a hydrolysis co-precipitation reaction, the titanium source and the germanium source are simultaneously deposited on the surface of the nanoporous supported deposition layer, after the addition is finished, the system is aged for 1.0-2.0 hours under agitating conditions; then a certain amount of the silicate ester is slowly added dropwise into the mixed solution, the pH of the system is adjusted to 9-10, and after the addition is finished, the system is aged for 1.0-3.0 hours for surface coating of the nano supported catalyst, the suspension is filtered, the filter cake is repeatedly washed with water until all chloride ions are removed; the filter cake is dried and ground to prepare the surface deposited supported titanium-germanium-based catalyst.

12. The method for preparing a supported catalyst according to claim 2, wherein, the germanium source is selected from one or two of germanium tetrachloride and tetraethylgermanium; and/or, the titanium source is selected from tetraisopropyl titanate, tetrabutyl titanate, titanium tetrachloride, and combinations thereof; and/or, the silicate ester is selected from tetraethyl silicate, tetrabutyl silicate, tetrapropyl silicate, and combinations thereof.

13. The method for preparing a supported catalyst according to claim 2, wherein, the solution of the germanium source in hydrochloric acid and the titanium source is added dropwise to the suspension of the carrier containing the supported deposition layer for hydrolysis reaction; and/or, the ratio of the mass of the silicate ester to the total mass of the germanium source and the titanium source is 1:(0.2-0.5).

14. The method for preparing a supported catalyst according to claim 2, wherein, the molar ratio of the titanium element to the germanium element in the active component is 1:(1.5-4.5).

15. The method for preparing a supported catalyst according to claim 1, wherein, the particle size of the supported germanium-based catalyst is 60-150 nm; the specific surface area is 100-280 m$^2$/g, and the particle size is between nanometer and sub-nanometer.

16. The method for preparing a supported catalyst according to claim 2, wherein, the particle size of the supported titanium-germanium-based catalyst is 60-150 nm; the specific surface area is 100-280 m$^2$/g, and the particle size is between nanometer and sub-nanometer.

17. A method for synthesizing a PETG or PCTG polyester, wherein, the synthesis method comprises steps of: carrying out a precipitation reaction on a suspension of a carrier, a water-soluble calcium salt, a water-soluble aluminum salt, a water-soluble zirconium salt with a water-soluble hydroxide and an alkali, filtering, and heat treating to form a supported deposition layer on the carrier; the alkali is selected from carbonates and/or bicarbonates; the specific surface area of the carrier containing the supported deposition layer is greater than the specific surface area of the carrier; dispersing the carrier containing the supported deposition layer in water to obtain a suspension of the carrier containing the supported deposition layer; carrying out a hydrolysis reaction on the suspension of the carrier containing the supported deposition layer with a germanium source to obtain a catalyst precursor; carrying out a reaction on the catalyst precursor with a silicate ester and water, and loading the active component on the supported deposition layer to obtain a surface deposited supported germanium-based catalyst; the inorganic porous material is selected from nanoporous alumina, nanoporous alumina-zirconia, nanoporous silica, nanoporous barium sulfate, and combinations thereof, with a particle size of 20-80 nm and a specific surface area of 220-400 m$^2$/g; using terephthalic acid, ethylene glycol, and 1,4-cyclohexanedimethanol as polymerization monomers to carry out esterification and polymerization reactions in the presence of a catalyst to obtain the PETG or PCTG, where the catalyst comprises the surface deposited supported germanium-based catalyst;

the water-soluble hydroxide is selected from one or two of sodium hydroxide and potassium hydroxide; the molar ratio of the water-soluble calcium salt, the water-soluble aluminum salt and the water-soluble zirconium salt for preparing the carrier containing the supported deposition layer is (0.5-2.5):(1.0-2.0):(0.8-3.5); in the surface deposited supported germanium-based catalyst, the mass ratio of the carrier, the supported deposition layer and the effective germanium in the active component is (72.5-87.5):(7.5-12.5):(5.0-15.0); the catalyst comprises a carrier, a supported deposition layer, and an active component, the carrier is an inorganic porous material modified and coated by a silicate ester, the supported deposition layer is located on the carrier and has a porous structure, and the active component is deposited on the supported deposition layer.

* * * * *